United States Patent
Bridges et al.

(10) Patent No.: US 9,441,932 B2
(45) Date of Patent: *Sep. 13, 2016

(54) TAPE MEASURE WITH FINGER DRAG BRAKE

(71) Applicant: Apex Brands, Inc., Apex, NC (US)

(72) Inventors: Tobias McKay Bridges, Holly Springs, NC (US); Jonathan S. Beckwith, Raleigh, NC (US)

(73) Assignee: APEX BRANDS, INC., Apex, NC (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/522,084

(22) Filed: Oct. 23, 2014

(65) Prior Publication Data

US 2015/0040416 A1 Feb. 12, 2015

Related U.S. Application Data

(63) Continuation of application No. 13/663,772, filed on Oct. 30, 2012, now Pat. No. 8,898,922.

(60) Provisional application No. 61/564,571, filed on Nov. 29, 2011.

(51) Int. Cl.
    *G01B 3/10* (2006.01)
(52) U.S. Cl.
    CPC .......... *G01B 3/1005* (2013.01); *G01B 3/1041* (2013.01); *G01B 2003/1007* (2013.01); *G01B 2003/1012* (2013.01)
(58) Field of Classification Search
    CPC .................................................. G01B 3/1005
    USPC ...................................................... 33/767, 768
    See application file for complete search history.

(56) References Cited

U.S. PATENT DOCUMENTS

| | | | |
|---|---|---|---|
| 3,281,943 A * | 11/1966 | Maksim, Jr. | G01B 3/10 33/768 |
| 5,295,308 A | 3/1994 | Stevens et al. | |
| 5,395,069 A | 3/1995 | Chen | |
| 5,657,551 A | 8/1997 | Lin | |
| 5,791,581 A | 8/1998 | Loeffler et al. | |
| D399,149 S | 10/1998 | Bennett | |
| 5,829,154 A * | 11/1998 | Lin | G01B 3/1005 242/384.7 |

(Continued)

FOREIGN PATENT DOCUMENTS

| CN | 2325755 Y | 6/1999 |
|---|---|---|
| CN | 2420613 Y | 2/2001 |

(Continued)

OTHER PUBLICATIONS

TW Search Report issued Aug. 25, 2014 in re TW Application No. 101144535 filed Nov. 28, 2012.

*Primary Examiner* — G. Bradley Bennett
(74) *Attorney, Agent, or Firm* — Coats & Bennett, PLLC (57) ABSTRACT

A tape measure is described that has a finger recess in a housing, with at least a portion of the underside of a tape blade exposed in the finger recess. Pressing a finger against the underside of the tape allows the user to create a drag brake that acts against the retraction spring to slow and/or stop the retraction of the tape blade. The lateral edges of the tape blade, for that portion of the tape blade disposed in the finger recess, are protected by the housing. This arrangement results in a compact yet versatile and safe overall tape measure with good tactile feedback during finger-braking.

20 Claims, 6 Drawing Sheets

(56) References Cited

U.S. PATENT DOCUMENTS

| | | |
|---|---|---|
| 6,115,933 A | 9/2000 | Li |
| 6,148,534 A | 11/2000 | Li |
| 6,161,299 A | 12/2000 | Lin |
| 6,167,635 B1 | 1/2001 | Lin |
| 6,272,764 B1 | 8/2001 | Lin |
| 6,276,071 B1 | 8/2001 | Khachatoorian |
| 6,470,590 B1 * | 10/2002 | Lee .................. G01B 3/1005 33/767 |
| 6,910,280 B2 * | 6/2005 | Scarborough ........ G01B 3/1041 33/42 |
| 6,976,318 B2 | 12/2005 | Odachowski |
| 7,131,215 B2 | 11/2006 | Kang |
| 7,174,656 B1 | 2/2007 | Smith |
| 7,506,456 B2 | 3/2009 | Hernandez |
| 7,584,549 B2 | 9/2009 | Lee et al. |
| 8,215,027 B2 | 7/2012 | Kang |
| 2004/0035017 A1 | 2/2004 | Yang |
| 2007/0056182 A1 | 3/2007 | Di Bitonto et al. |
| 2008/0034604 A1 | 2/2008 | Critelli et al. |
| 2010/0212175 A1* | 8/2010 | Choi .................. G01B 3/1005 33/761 |
| 2012/0131810 A1* | 5/2012 | Hunsberger ......... G01B 3/1005 33/767 |
| 2013/0025147 A1 | 1/2013 | Steele et al. |
| 2013/0025148 A1 | 1/2013 | Steele et al. |
| 2015/0075022 A1* | 3/2015 | Bitton ................. B25H 7/04 33/760 |

FOREIGN PATENT DOCUMENTS

| | | |
|---|---|---|
| CN | 1938558 A | 3/2007 |
| TW | 347869 A | 12/1998 |

* cited by examiner

TAPE MEASURE WITH FINGER DRAG BRAKE

This application is a continuation of U.S. application Ser. No. 13/663,772, filed 30 Oct. 2012, which claims the benefit of U.S. Provisional Application No. 61/564,571, filed 29 Nov. 2011, the disclosures of all of which are incorporated herein by reference in their entirety.

BACKGROUND

"Power-return" tape measures typically employ a mechanical spring to supply a retraction force that urges the tape blade to retract into the housing. Such tape measures typically include a manually actuated lock mechanism to lock the tape blade, once deployed, in the deployed position. Release of the lock mechanism causes the tape blade to retract under the bias of the spring. The speed of retraction may be faster than desired in some situations. As such, some tape measures have been proposed that utilize finger-controlled drag brakes in addition to the locking mechanism. For example, see U.S. Pat. Nos. 7,174,656 and 6,161,299. While such approaches have provided some desired functionality, there remains a need for alternative designs for tape measures that include drag brake functionality.

SUMMARY

A tape measure is described that has a finger recess in a housing, with at least a portion of the underside of a tape blade exposed in the finger recess. Pressing a finger against the underside of the tape allows the user to create a drag brake that acts against the retraction spring to slow and/or stop the retraction of the tape blade. The lateral edges of the tape blade, for that portion of the tape blade disposed in the finger recess, are protected by the housing. This arrangement results in a compact yet versatile and safe overall tape measure with good tactile feedback during finger-braking.

In one embodiment, the present invention provides a tape measure having a housing having an exit port and a finger recess. A tape blade having measuring indicia thereon is moveable between a deployed configuration where the tape blade extends forwardly outward from the housing at the exit port and a retracted configuration where the tape blade is substantially retracted into the housing. The tape blade biased toward the retracted configuration. The tape blade exits the housing at the exit port in the deployed configuration. The finger recess is disposed rearwardly relative to the exit port. A laterally central portion of an underside surface of the tape blade is externally exposed in the finger recess. However, lateral edges of the tape blade, for a longitudinal portion of the tape blade spanning the finger recess, are protected by the housing so as to be not externally exposed when viewed from directly below the tape measure.

Some or all of the embodiments may have the following aspects. An end hook may be slidably mounted to a distal end portion of the tape blade, with the end hook extending through the exit port when the tape blade is in the retracted configuration. The end hook may comprise first and second downwardly extending legs. A lock may be movably disposed in the housing and operative to selectively inhibit retraction of the tape blade via selective engagement with the tape blade. The tape blade may naturally assume a concavo-convex cross-sectional configuration when deployed from the housing. The tape blade may form a convolute coil on a drum in the retracted configuration, the drum being disposed in the housing and rotatable relative thereto about a rotational axis; wherein the finger recess is disposed forwardly relative to the rotational axis. A portion of tape blade disposed in the finger recess may have a downstream cross-section disposed closer to the exit port and an upstream cross-section disposed farther from the exit port, with the downstream cross-section having a greater height than the upstream cross-section. The housing may comprise a generally planar lower surface that extends forwardly and rearwardly of the finger recess. The housing may comprise lateral sidewalls, and the finger recess may extend across a bottom of the housing and partially along the sidewalls and taper into the sidewalls.

In another embodiment, the present invention provides a method of operating a tape measure. The tape measure includes a housing, a tape blade selectively deployable from the housing, with the housing having a finger recess. The method includes deploying a portion of the tape blade forwardly from the housing at an exit port; thereafter retracting at least a segment of the portion of the tape blade into the housing. During the retracting, the method includes pressing a finger upward against a underside surface of the tape blade that is exposed in the finger recess. The finger recess is disposed rearwardly relative to the exit port. During the retracting, lateral edges of the tape blade, for a longitudinal segment of the tape blade spanning the finger recess, are protected by the housing so as to be not engageable by a user of the tape measure.

The segment of the tape blade disposed in the finger recess may have a downstream cross-section disposed closer to the exit port and an upstream cross-section disposed farther from the exit port, with the downstream cross-section having a greater height than the upstream cross-section. The pressing the finger upward against the underside surface of the tape blade may cause the retracting to stop. The method may further include thereafter removing the finger from the underside surface of the tape blade and further retracting the tape blade. The may include, after the deploying and prior to the retracting, engaging a workpiece with a downwardly extending leg of an end hook attached to the tape blade. A distal portion of the tape blade may naturally assume a concavo convex cross-sectional configuration during the deploying. The method may include thereafter resting the tape measure on a generally planar lower surface that extends forwardly and rearwardly of the finger recess. The method may be such that 1) the finger recess includes an access opening providing access to the underside of the tape blade, with the access opening having a different contour at a forward edge thereof than at a rearward edge thereof; and 2) prior to the retracting and with the tape blade deployed, a lock member associated with the housing is engaged against the tape blade to lock the tape blade relative to the housing.

Of course, the present invention is not limited to the above features and advantages. Indeed, those skilled in the art will recognize additional features and advantages upon reading the following detailed description, and upon viewing the accompanying drawings. The various aspects discussed above may be used alone or in any combination.

DETAILED DESCRIPTION

In one embodiment, the present application is directed to a tape measure having a finger recess in a housing, with at least a portion of the underside of a tape blade externally exposed in the finger recess. Pressing a finger against the underside of the tape blade allows the user to create a drag brake that acts against the retraction spring to slow and/or stop the retraction of the tape blade. The lateral edges of the tape blade, for that portion of the tape blade disposed in the finger recess, are protected by the housing. This arrangement results in a compact yet versatile and safe overall tape measure with good tactile feedback during finger-braking.

Figure 1:
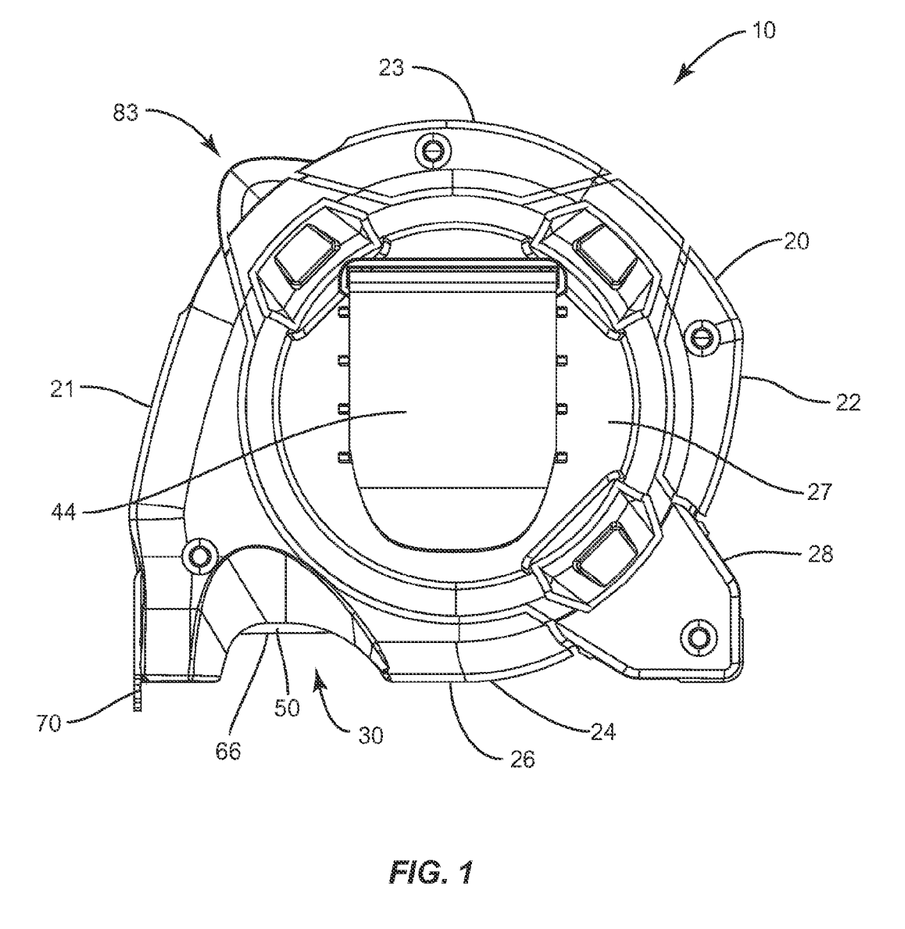
FIG. 1 shows a side view of a tape measure according to an embodiment of the present invention.
Figure 2:
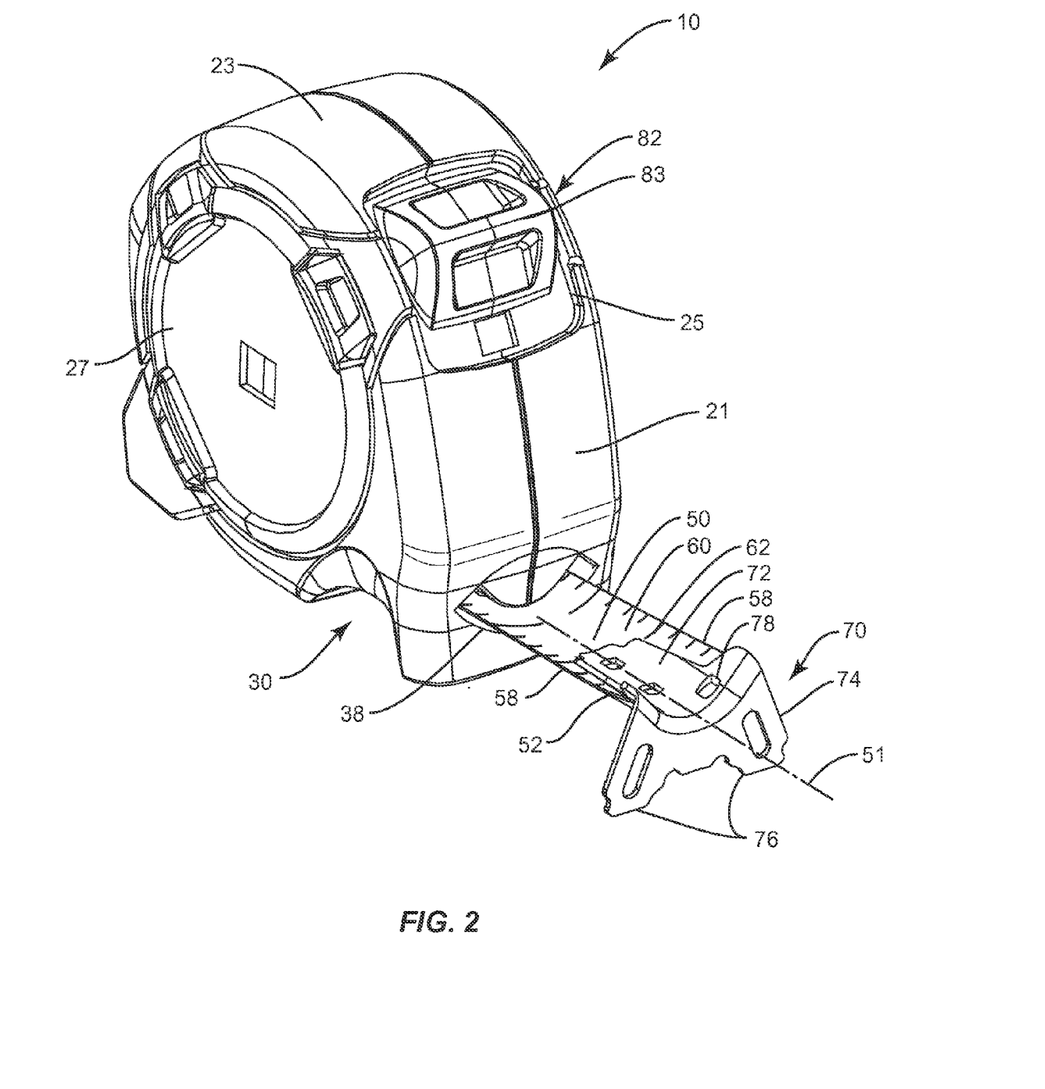
FIG. 2 shows a perspective view of the tape measure of FIG. 1, showing the tape blade deployed and the lock in the unlocked position.
Figure 3:
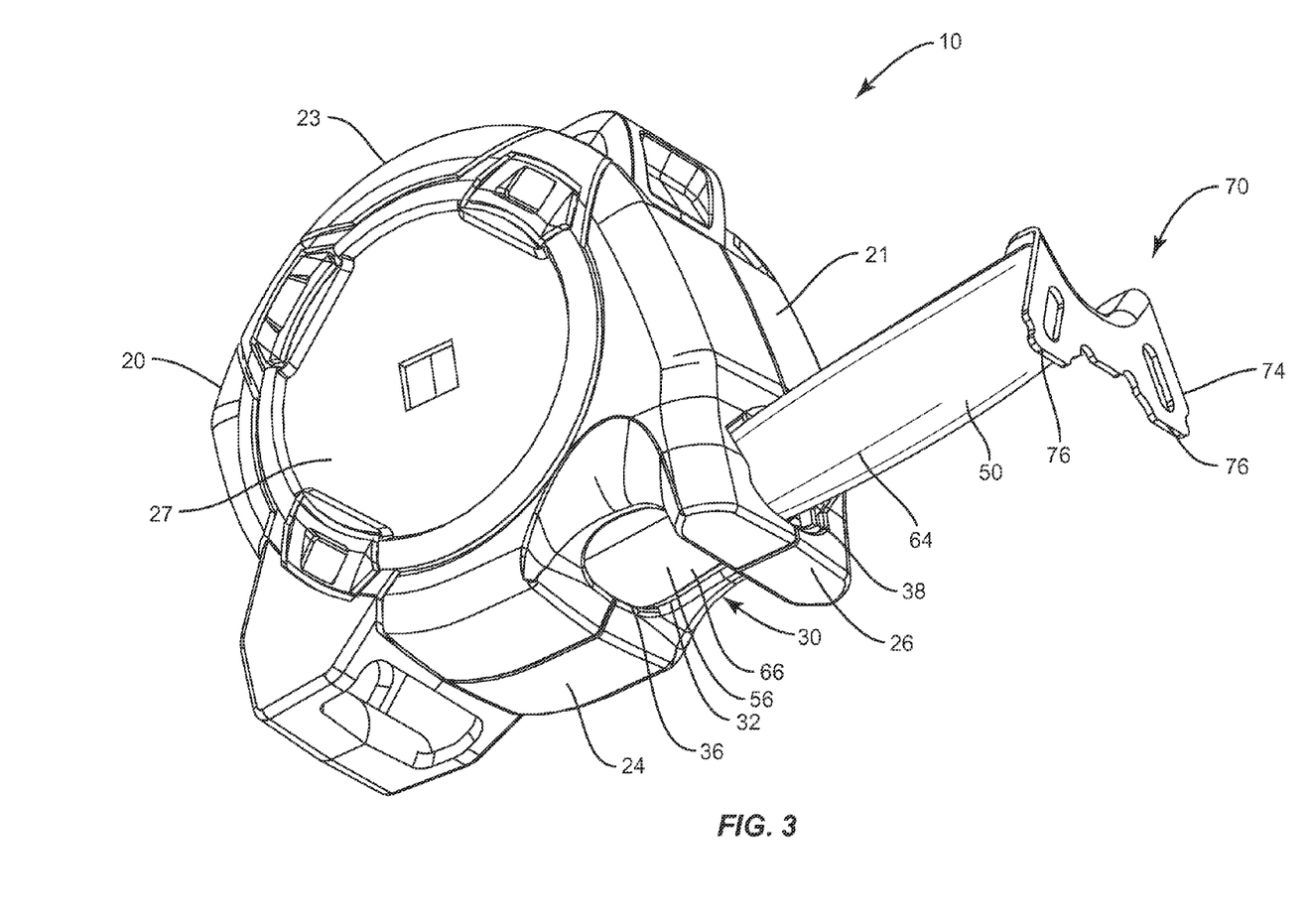
FIG. 3 shows an underside perspective view of the tape measure of FIG. 2.
Figure 4:
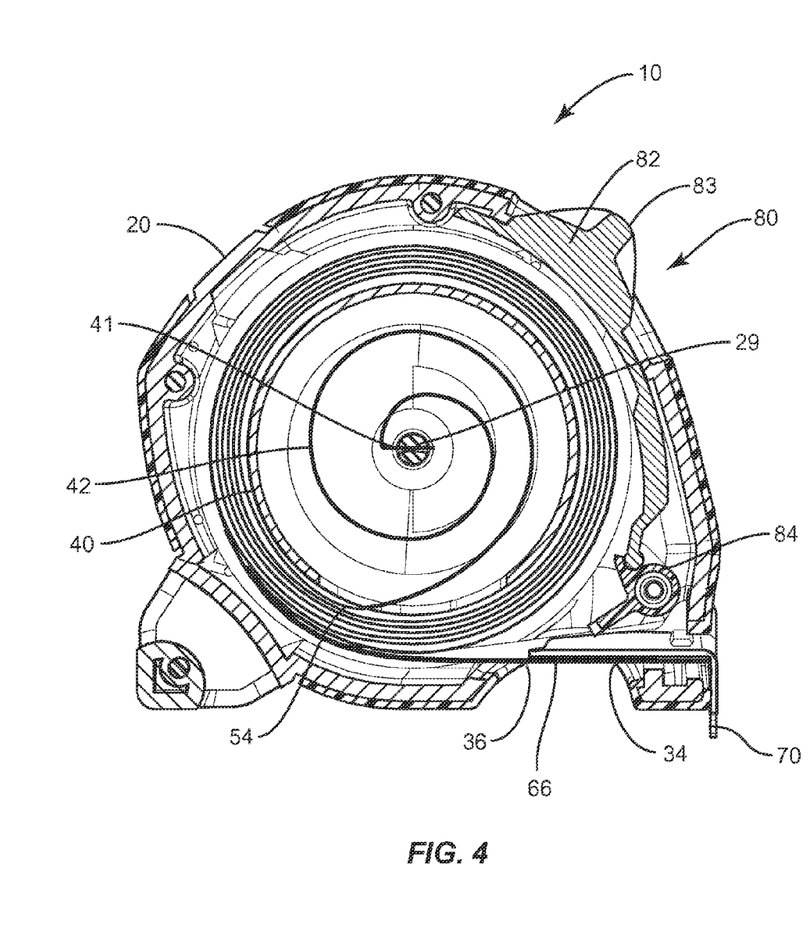
FIG. 4 shows a cross-sectional side view of the tape measure of FIG. 2, with the tape blade fully retracted and the lock in the unlocked position.
Figure 5:
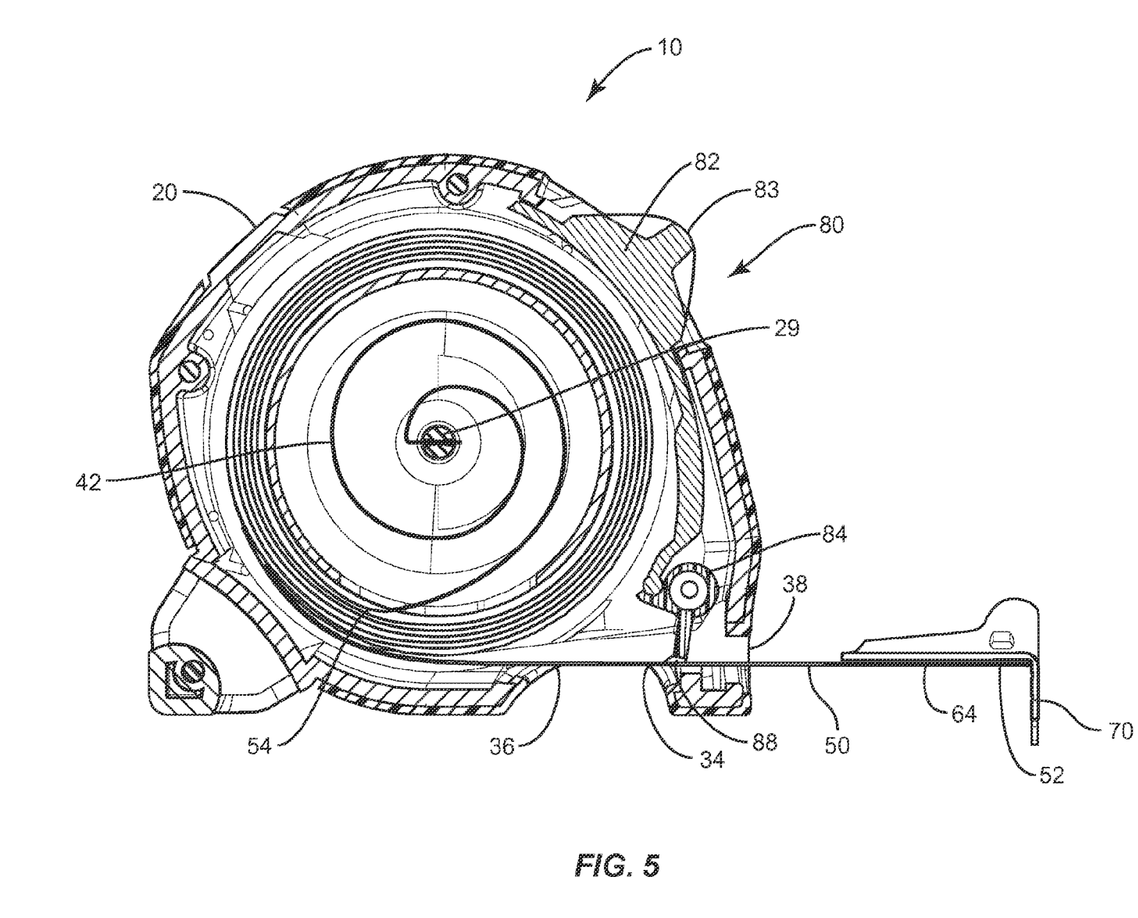
FIG. 5 shows a cross-sectional side view of the tape measure of FIG. 2, with the tape blade deployed and the lock in the locked position.

Referring to FIG. 1, a tape measure 10 according to one or more embodiments includes a housing 20 and a tape blade 50 selectively deployable from the housing 20. The housing 20 may take any of a variety of shapes known in the art, but advantageously has a generally rectangular shape in side profile, with a front face 21, a rear 22, a top 23, a bottom 24, and lateral sidewalls 27. The tape blade 50 extends from the housing 20, when deployed, at an exit port 38 located in the lower portion of the front 21. The top 23 and/or front 21 advantageously includes a lock actuator opening 25 that allows a lock actuator 82 to slide relative to the housing 20 in a conventional fashion. The housing 20 may optionally include a clasp extension 28, such as at the lower rear corner, for allowing attachment of a clasp such as a carabiner, for hanging the tape measure 10 when not in use.

The bottom 24 of the housing 20 includes a finger recess 30. The finger recess 30 is formed by an upward indention in the bottom 24. The lower surface 26 of the bottom 24 may advantageously be generally planar, and extend both forward and rearward of the finger recess 30, so as to provide a flat surface for standing the tape measure 10 upright on a work surface. The finger recess 30 includes an opening 32 through which the tape blade 50 is exposed. The opening 32 has a forward edge 34 and a rearward edge 36, which may have different lateral cross-sectional profiles as discussed further below. The finger recess 30 advantageously may be configured such that the lateral sides thereof blend into the sidewalls 27 if desired.

The housing 20 is advantageously formed of a suitable hard plastic, but any material known in the art may be used. The housing 20 may optionally include softer plastic overmolding for enhanced feel, as is known in the art. Also, a belt clip 44 may be mounted the housing 20 if desired.

A drum 40 is rotatably mounted in the housing 20 for rotation about a drum rotational axis 41. The drum 40 provides a means for winding the tape blade 50 into a convolute coil shape when the tape blade 50 is retracted into the housing 20. The housing 20 also advantageously includes a suitable post 29 for anchoring one end of a retraction spring 42 that supplies a retraction bias to the tape blade 50 in any known fashion.

The tape blade 50 is advantageously formed of metal with a polymer coating as is conventional, but any other materials known in the art may alternatively be used. The tape blade 50 includes suitable length indicia 62 on an upper surface 60 thereof to indicate distance along its longitudinal axis, as is conventional. While not required, the tape blade 50 advantageously has a concavo-convex cross-sectional profile when extended from the housing 20. However, the tape blade 50 advantageously assumes a flattened profile for the portion thereof wound on the drum 40. The proximal end portion 54 of the tape blade 50 is mounted to the drum 40 and/or the spring 42 so as to be moveably anchored inside the housing 20. The distal end portion 52 of the tape blade 50 is intended to be repeatably deployed from and retracted into the housing 20 via exit port 38. As is conventional, an end hook 70 may be attached to the distal end portion 52 of the tape blade 50. The end hook 70 may take any form known in the art. The end hook 70 typically includes a mounting portion 72 that extends parallel to the longitudinal axis 51 of the tape blade 50, and a hooking portion 74 that extends generally perpendicular thereto. In some embodiments, the hooking portion 74 of the end hook 70 may have two legs 76 that extend downward and/or outward. The end hook 70 may be slidably mounted to the tape blade 50 by (not shown) rivets that extend through slots 78 in the mounting portion 72, so as facilitate both "inside" and "outside" length measurements. Typically, the mounting portion of the end hook 70 extends into and through the exit port 38 when the tape blade 50 is fully retracted.

The tape blade 50 is selectively deployable from the housing 20. Thus, the tape measure 10 is changeable from a deployed configuration where the tape blade 50 extends forwardly from the housing 20 (with the end hook 70 spaced from the housing 20) for taking measurements to a retracted configuration where the tape blade 50 is retracted into the housing 20 (and the end hook 70 is advantageously abutting the housing 20). Because the tape blade 50 is under a retraction bias from the spring 42, a lock mechanism (or simply "lock") 80 is provided to allow the tape blade 50 to be locked in position when deployed. The lock 80 may take any form known in the art. For example, the lock 80 may include an actuator 82 having an externally accessible button 83, and a pivotally mounted locking arm 84. Movement of the actuator 82 forward/downward causes the locking arm 84 to pivot so that it comes in contact with an upper surface 60 of the tape blade 50 at a blade engagement location 88 and presses the tape blade 50 against the housing 20 to as to lock the tape blade 50 in position. Movement of the actuator 82 rearward/upward causes the locking arm 84 to pivot so as to move out of engagement with the tape blade 50, thereby allowing the spring 42 to pull the tape blade 50 backward to the fully retracted position. Regardless of the particular lock structure used, the lock 80 is movable between a locked position where the lock 80 is in engagement with the tape blade 50 at the blade engagement location 88 and an unlocked position where the lock 80 is in spaced relation to the tape blade 50.

Figure 6:
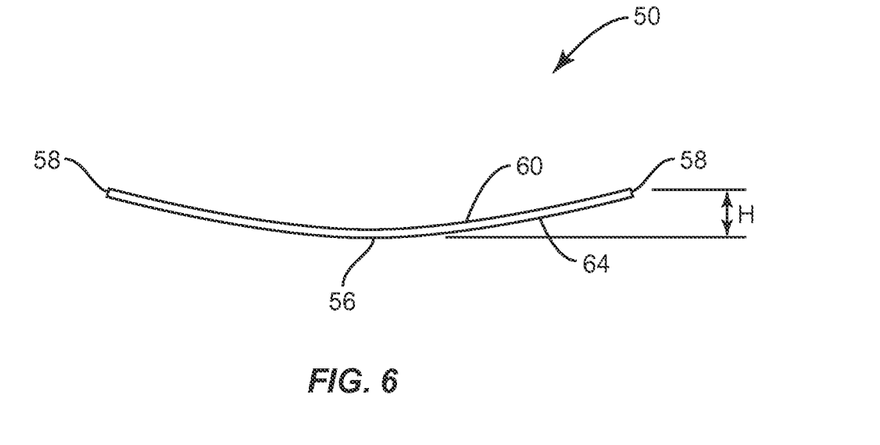
FIG. 6 shows a cross-section of the tape blade, normal the longitudinal axis of the tape blade, at the rearward edge of the opening of the finger recess for the tape measure of FIG. 5.
Figure 7:
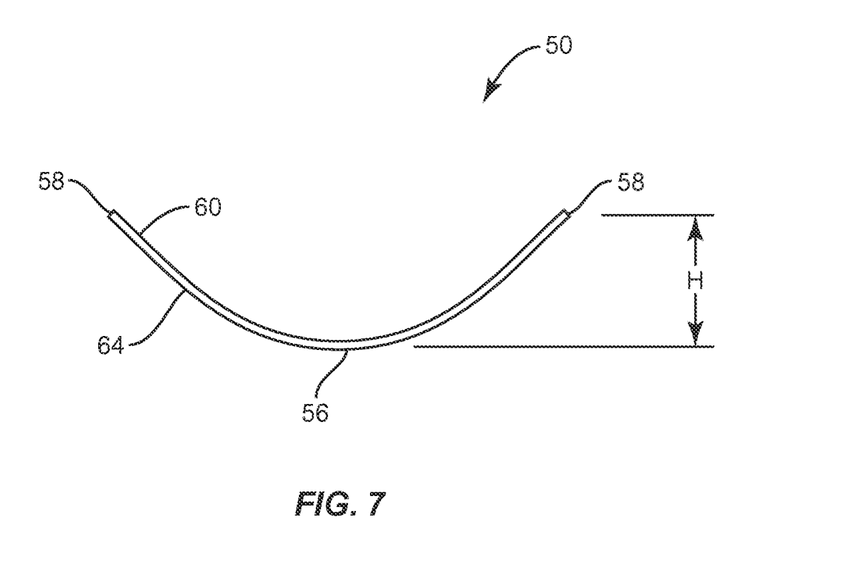
FIG. 7 shows a cross-section of the tape blade, normal the longitudinal axis of the tape blade, at the forward edge of the opening of the finger recess for the tape measure of FIG. 5.

The finger recess 30 allows the user to apply finger pressure to the tape blade 50 to either slow down or stop the retraction of the tape blade 50 when the lock 80 is in the unlocked position. The tape blade 50 passes through the finger recess 30 when moving from the drum 40 to the exit port 38 (and then out of housing 20). The underside surface 64 of the tape blade 50, for that segment 66 of the tape blade 50 in the finger recess 30, is exposed due to the opening 32 in the housing 20 at the finger recess 30. In some embodiments, the finger recess 30 may be configured so that the entire lateral width of the tape blade 50 is exposed in the finger recess 30. Thus, in some embodiments, the lateral edges 58 of the segment 66 of the tape blade 50 disposed in the finger recess 30 may be exposed. However, in other embodiments, the lateral edges 58 of the tape blade 50 are advantageously protected by the housing 20 such that only a laterally central portion 56 of the tape blade 50 cross-section is externally exposed in the finger recess 30, while the lateral edges 58 are hidden by the housing 20. This latter arrangement is believed to help inhibit debris from entering the housing 20 and potentially adversely affecting the deployment/retraction action of the tape blade 50. Further, this latter arrangement is believed to help protect the user's finger(s) from the relatively "sharper" lateral edges 58 of the tape blade 50. It is possible that the tape blade 50 will have a different cross-sectional profile at the forward portion of the finger recess 30 than at the rearward portion of the finger recess 30. For example, the cross-sectional profile of the tape blade 50 at the forward edge 34 of opening 32 may be more curved so as to have greater height H than the cross-sectional profile of the tape blade 50 at the rearward edge 36 of opening 32 (see FIGS. 6-7). Advantageously, the contour of the opening 32 likewise differently shaped at the forward edge 34 and the rearward edge 36 to match this difference in cross-sectional profile of the tape blade 50.

From the fully retracted configuration and the lock 80 in the unlocked position, the user may deploy the tape blade 50 to a first long desired length, and optionally lock the tape blade 50 in position and take a measurement. The user may then release the lock 40 if locked, and allow the tape blade 50 to start retraction. The user presses their finger upward against the exposed underside surface 64 of tape blade 50 in the finger recess 30, advantageously against the laterally central portion 56, to apply a finger-braking action that slows down or stops the retraction. The finger-braking action, or retardation force, is a result of frictional drag of the user's finger against the underside surface 64 of the tape blade 50 in the finger recess 30. Because the finger-braking action is due to the direct contact of the user's finger against the tape blade 50, the user is provided with good tactile feel of the braking action. Advantageously, the finger-breaking is achieved without pressing the laterally central portion 56 of tape blade 50 against a support internal to the housing 20, so that the good tactile feel is maintained. Further, the finger-breaking advantageously does not distort the tape blade 50 so as to breakback/buckle the tape blade 50. Release of the finger pressure allows the retardation force to be removed. Thus, a user is able to control the tape blade 50 retraction via application of finger force against the underside surface 64 of the tape blade 50 at the finger recess 30.

It should be noted that the finger recess 30 is located behind (or "upstream", i.e., closer to the coiled portion of the retracted tape blade inside the housing) of the tape exit port 38 where the tape blade 50 exits the housing 20. Indeed, the finger recess 30 is spaced rearward from the exit port 38 so that the housing 20 may provide a suitable stopping surface to stop the end hook 70 when the tape blade 50 is fully retracted. Further, the location of the finger recess 30 corresponds to a natural location for the user's finger when holding the tape measure 10. In addition, this configuration allows the blade engagement location 88 associated with the lock 80 to be located forward of the finger recess 30, allowing for compact yet versatile overall tape measure 10. In most embodiments, the configuration of the opening 32 and finger recess 30 allows for use of a tape blade 50 with relatively high natural cross-sectional height (high concavity).

In some embodiments, the housing 20 may optionally include a tape blade wiping feature proximate forward edge 34 and/or rearward edge 36 of opening 32, to help inhibit dirt infiltration. The wiping feature may take any suitable form, such as a foam and/or elastomeric material, a curved ridge on the housing that acts as a scraping blade against the tape blade, or the like.

In some embodiments, one or more lights (e.g., LED's) may be disposed in the housing 20 so as to shine forwardly or forwardly/downwardly when energized. Such lights (not shown) may be powered by any known means (e.g., battery, wind-up mechanism, capacitor(s), etc.) and controlled via a suitable switch.

Additional information about optional configurations relating to post 29 may be found in U.S. Pat. No. 6,718,649 and U.S. Pat. No. 7,458,537. Additional information about optional configurations relating to spring 42 may be found in U.S. Pat. No. 6,718,649. Additional information about optional configurations relating to end hook 70 may be found in U.S. Pat. No. 5,010,657 and U.S. Pat. No. 7,240,439. Additional information about optional configurations relating to tape blade 50 may be found in U.S. Patent Application Publication No. 2004/0071869. The disclosures of these U.S. patents and patent application publications are hereby incorporated herein by reference in their entirety.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A tape measure, comprising:
a housing having an exit port and a finger recess;
a tape blade having measuring indicia thereon, the tape blade moveable between a deployed configuration where the tape blade extends forwardly outward from the housing at the exit port and a retracted configuration where the tape blade is substantially retracted into the housing; the tape blade biased toward the retracted configuration;
wherein the tape blade exits the housing at the exit port in the deployed configuration;
wherein the finger recess is disposed rearwardly relative to the exit port;
wherein a laterally central portion of an underside surface of the tape blade is externally exposed in the finger recess;
wherein lateral edges of the tape blade, for a longitudinal portion of the tape blade spanning the finger recess, are protected by the housing so as to be not externally exposed when viewed from directly below the tape measure.

2. The tape measure of claim 1, further comprising an end hook slidably mounted to a distal end portion of the tape blade; wherein the end hook extends through the exit port when the tape blade is in the retracted configuration; wherein the end hook comprises first and second downwardly extending legs.

3. The tape measure of claim 1, further comprising a lock movably disposed in the housing and operative to selectively inhibit retraction of the tape blade via selective engagement with the tape blade.

4. The tape measure of claim 1, wherein the tape blade naturally assumes a concavo-convex cross-sectional configuration when deployed from the housing.

5. The tape measure of claim 1, wherein the tape blade forms a convolute coil on a drum in the retracted configuration, the drum disposed in the housing and rotatable relative thereto about a rotational axis; wherein the finger recess is disposed forwardly relative to the rotational axis.

6. The tape measure of claim 1, wherein the portion of tape blade disposed in the finger recess has a downstream cross-section disposed closer to the exit port and an upstream cross-section disposed farther from the exit port; wherein the downstream cross-section has a greater height than the upstream cross-section.

7. The tape measure of claim 1, wherein the housing comprises a generally planar lower surface that extends forwardly and rearwardly of the finger recess.

8. The tape measure of claim 1:
wherein the housing comprises lateral sidewalls;
wherein the finger recess extends across a bottom of the housing and partially along the sidewalls and tapers into the sidewalls.

9. The tape measure of claim 1:
wherein the finger recess includes an access opening providing access to the underside of the tape blade;
wherein the access opening has a different profile for a forward edge than a rearward edge, the forward edge disposed closer to the tape exit than the rearward edge;
wherein the access opening is laterally narrower than the tape blade portion in the finger recess.

10. The tape measure of claim 9, wherein the rearward edge of the access opening is disposed forward of an axis about which the tape blade is wound when retracted.

11. The tape measure of claim 1:
wherein the housing comprises lateral sidewalls;
wherein the finger recess extends across a bottom of the housing and partially along the sidewalls and tapers into the sidewalls.

12. The tape measure of claim 1:
wherein the tape blade naturally assumes a concavo-convex cross-sectional configuration when deployed from the housing;
wherein the tape blade forms a convolute coil on a drum in the retracted configuration, the drum disposed in the housing and rotatable relative thereto about a rotational axis; wherein the finger recess is disposed forwardly relative to the rotational axis;
wherein the housing comprises lateral sidewalls;
wherein the finger recess extends across a bottom of the housing and partially along the sidewalls and tapers into the sidewalls; wherein the finger recess includes an access opening providing access to the underside of the tape blade;
wherein the finger recess includes an access opening providing access to the underside of the tape blade;
wherein the access opening has a different profile for a forward edge than a rearward edge, the forward edge disposed closer to the tape exit than the rearward edge;
wherein the access opening is laterally narrower than the tape blade portion in the finger recess.

13. A method of operating a tape measure, the tape measure having a housing and a tape blade selectively deployable from the housing, the housing having a finger recess, the method comprising:
deploying a portion of the tape blade forwardly from the housing at an exit port;
thereafter retracting at least a segment of the portion of the tape blade into the housing;
during the retracting, pressing a finger upward against a underside surface of the tape blade that is exposed in the finger recess;
wherein the finger recess is disposed rearwardly relative to the exit port;
wherein, during the retracting, lateral edges of the tape blade, for a longitudinal segment of the tape blade spanning the finger recess, are protected by the housing so as to be not engageable by a user of the tape measure.

14. The method of claim 13, wherein the segment of the tape blade disposed in the finger recess has a downstream cross-section disposed closer to the exit port and an upstream cross-section disposed farther from the exit port; wherein the downstream cross-section has a greater height than the upstream cross-section.

15. The method of claim 13, wherein the pressing the finger upward against the underside surface of the tape blade causes the retracting to stop.

16. The method of claim 15, further comprising thereafter removing the finger from the underside surface of the tape blade and further retracting the tape blade.

17. The method of claim 13, further comprising, after the deploying and prior to the retracting, engaging a workpiece with a downwardly extending leg of an end hook attached to the tape blade.

18. The method of claim 13, wherein a distal portion of the tape blade naturally assumes a concavo-convex cross-sectional configuration during the deploying.

19. The method of claim 13, further comprising thereafter resting the tape measure on a generally planar lower surface that extends forwardly and rearwardly of the finger recess.

20. The method of claim 13:
wherein the finger recess includes an access opening providing access to the underside of the tape blade, with the access opening having a different contour at a forward edge thereof than at a rearward edge thereof;
further comprising, prior to the retracting and with the tape blade deployed, engaging a lock member associated with the housing against the tape blade to lock the tape blade relative to the housing.

* * * * *